(12) United States Patent
Kjeldsen et al.

(10) Patent No.: US 12,144,007 B2
(45) Date of Patent: *Nov. 12, 2024

(54) SYSTEMS AND METHODS FOR FACILITATING WIRELESS INTERCOM IN A LOCAL COMMUNICATIONS NETWORK

(71) Applicants: RTX A/S, Nørresundby (DK); H.M. Electronics, Inc., Carlsbad, CA (US)

(72) Inventors: Thomas Krag Kjeldsen, Alborg (DK); Mads Ramsgaard Munk, Alborg (DK); Stephane Menard, Montreal (CA); Hsin-Yun Yao, Montreal (CA); Alexandre Beaulieu, Montreal (CA); Scott Weldner, Poway, CA (US)

(73) Assignees: RTX A/S, Nørresundby (DK); H.M. Electronics, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,232

(22) Filed: Oct. 19, 2023

(65) Prior Publication Data

US 2024/0049259 A1 Feb. 8, 2024

Related U.S. Application Data

(63) Continuation of application No. 17/958,153, filed on Sep. 30, 2022, now Pat. No. 11,812,448, which is a
(Continued)

(51) Int. Cl.
*H04H 20/71* (2008.01)
*H04N 7/14* (2006.01)
(Continued)

(52) U.S. Cl.
CPC ............ *H04W 72/30* (2023.01); *H04N 7/147* (2013.01); *H04W 72/044* (2013.01); *H04L 12/1881* (2013.01)

(58) Field of Classification Search
CPC ............... H04W 72/30; H04W 72/044; H04W 72/21; H04W 84/16; H04W 72/005; H04W 4/06;
(Continued)

(56) References Cited

U.S. PATENT DOCUMENTS

| 8,473,984 B1* | 6/2013 | Harmon ............. H04N 21/6547 725/38 |
| 9,432,165 B2* | 8/2016 | Nako ............... H04W 72/0453 |

(Continued)

*Primary Examiner* — Phuongchau Ba Nguyen
(74) *Attorney, Agent, or Firm* — Esplin & Associates, PC

(57) ABSTRACT

Systems and methods for facilitating wireless intercom in a local communications network are disclosed. Exemplary implementations may: generate and transmit a first broadcast packet and a second broadcast packet to a set of end-user communication devices; receive a first device-specific packet, on a first channel by a first central antenna and during a first uplink time period; receive a second device-specific packet, on the first channel by the first central antenna and during a second uplink time period; receive the first device-specific packet, on a second channel by a second central antenna and during a third uplink time period; receive the second device-specific packet, on the second channel by the second central antenna and during a fourth uplink time period; generate a third broadcast packet that includes packetized downlink information; and transmit the third broadcast packet to the set of end-user communication devices.

20 Claims, 6 Drawing Sheets

Related U.S. Application Data continuation of application No. 17/152,047, filed on Jan. 19, 2021, now Pat. No. 11,463,989.

(60) Provisional application No. 62/963,706, filed on Jan. 21, 2020.

(51) Int. Cl.
*H04W 72/044* (2023.01)
*H04W 72/30* (2023.01)
*H04L 12/18* (2006.01)

(58) Field of Classification Search
CPC ..... H04W 8/26; H04N 7/147; H04L 12/1881; H04L 12/189; H04L 12/185
See application file for complete search history.

(56) References Cited

U.S. PATENT DOCUMENTS

| | | | |
|---|---|---|---|
| 10,993,088 B1* | 4/2021 | O'Gwynn | H04W 4/08 |
| 2010/0311320 A1* | 12/2010 | Jung | H04W 4/06 |
| | | | 455/3.01 |
| 2011/0165865 A1* | 7/2011 | Gao | H04W 72/30 |
| | | | 455/414.1 |
| 2016/0057504 A1* | 2/2016 | Shelby | H04W 72/0453 |
| | | | 725/62 |

* cited by examiner

SYSTEMS AND METHODS FOR FACILITATING WIRELESS INTERCOM IN A LOCAL COMMUNICATIONS NETWORK

FIELD OF THE DISCLOSURE

The present disclosure relates to systems and methods for facilitating wireless intercom in a local communications network, and, in particular, for communication between central communication devices and end-user communication devices without the need or use of cellular networks or public networks.

BACKGROUND

Intercom systems using a central communication device and an end-user communication device are known.

SUMMARY

One aspect of the present disclosure relates to a system configured for facilitating wireless intercom in a local communications network, particularly a wireless communications network. The system may include one or more hardware processors configured by machine-readable instructions. The processor(s) may be configured to generate a first broadcast packet and a second broadcast packet. The processor(s) may be configured to transmit the first broadcast packet, via a first central antenna of a central communication device and using a first channel of a first frequency range, to a set of end-user communication devices. The set of end-user communication devices may include a first end-user communication device, a second end-user communication device, and/or other devices. The processor(s) may be configured to transmit the second broadcast packet, via a second central antenna of the central communication device and using a second channel of the first frequency range, to the set of end-user communication devices. The processor(s) may be configured to receive a first device-specific packet, on the first channel by the first central antenna and during a first uplink time period (i.e., a first period). The first device-specific packet may be received from (i.e., subsequent to transmission by) the first end-user communication device. The first device-specific packet may include packetized uplink information based on audio and/or video information captured by the first end-user communication device. The processor(s) may be configured to receive a second device-specific packet, on the first channel by the first central antenna and during a second uplink time period (i.e., a second period). The second device-specific packet may be received from the second end-user communication device. The processor(s) may be configured to receive the first device-specific packet, on the second channel by the second central antenna and during a third uplink time period (i.e., a third period). The first device-specific packet may be received from the first end-user communication device. The third uplink time period may not coincide with the first uplink time period, thereby providing time diversity for communications of the first device-specific packet by the first end-user communication device. The first channel may use a different frequency band than the second channel, thereby providing frequency diversity for communications of the first device-specific packet by the first end-user communication device. The processor(s) may be configured to receive the second device-specific packet, on the second channel by the second central antenna and during a fourth uplink time period (i.e., a fourth period). The second device-specific packet may be received from the second end-user communication device. The fourth uplink time period may not coincide with the second uplink time period. The processor(s) may be configured to generate a third broadcast packet that includes packetized downlink information. The packetized downlink information may be based on the audio information of the first device-specific packet. The third broadcast packet may include a destination indication that indicates a network destination in the local communications network for the included packetized downlink information. The network destination may include the second end-user communication device. The processor(s) may be configured to transmit the third broadcast packet to the set of end-user communication devices.

Another aspect of the present disclosure relates to a method for facilitating wireless intercom in a local communications network. The method may include generating a first broadcast packet and a second broadcast packet, by a central communication device. The method may include transmitting the first broadcast packet, via a first central antenna of the central communication device and using a first channel of a first frequency range, to a set of end-user communication devices. The set of end-user communication devices may include a first end-user communication device, a second end-user communication device, and/or other devices. The method may include transmitting the second broadcast packet, via a second central antenna of the central communication device and using a second channel of the first frequency range, to the set of end-user communication devices. The method may include receiving a first device-specific packet, on the first channel by the first central antenna and during a first uplink time period. The first device-specific packet may be received from the first end-user communication device. The first device-specific packet may include packetized uplink information based on audio information captured by the first end-user communication device. The method may include receiving a second device-specific packet, on the first channel by the first central antenna and during a second uplink time period. The second device-specific packet may be received from the second end-user communication device. The method may include receiving the first device-specific packet, on the second channel by the second central antenna and during a third uplink time period. The first device-specific packet may be received from the first end-user communication device. The third uplink time period may not coincide with the first uplink time period, thereby providing time diversity for communications of the first device-specific packet by the first end-user communication device. The first channel may use a different frequency band than the second channel, thereby providing frequency diversity for communications of the first device-specific packet by the first end-user communication device. The method may include receiving the second device-specific packet, on the second channel by the second central antenna and during a fourth uplink time period. The second device-specific packet may be received from the second end-user communication device. The fourth uplink time period may not coincide with the second uplink time period. The method may include generating a third broadcast packet that includes packetized downlink information. The packetized downlink information may be based on the audio information of the first device-specific packet. The third broadcast packet may include a destination indication that indicates a network destination in the local communications network for the included packetized downlink information. The network destination may include the second end-user communication device. The method may include transmitting the third broadcast packet to the set of end-user communication devices.

As used herein, any association (or relation, or reflection, or indication, or correspondency) involving information processing units, processors, client computing platforms, devices, packets, antennas, channels, frequency ranges, time periods, time periods, timeframes, networks, users, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
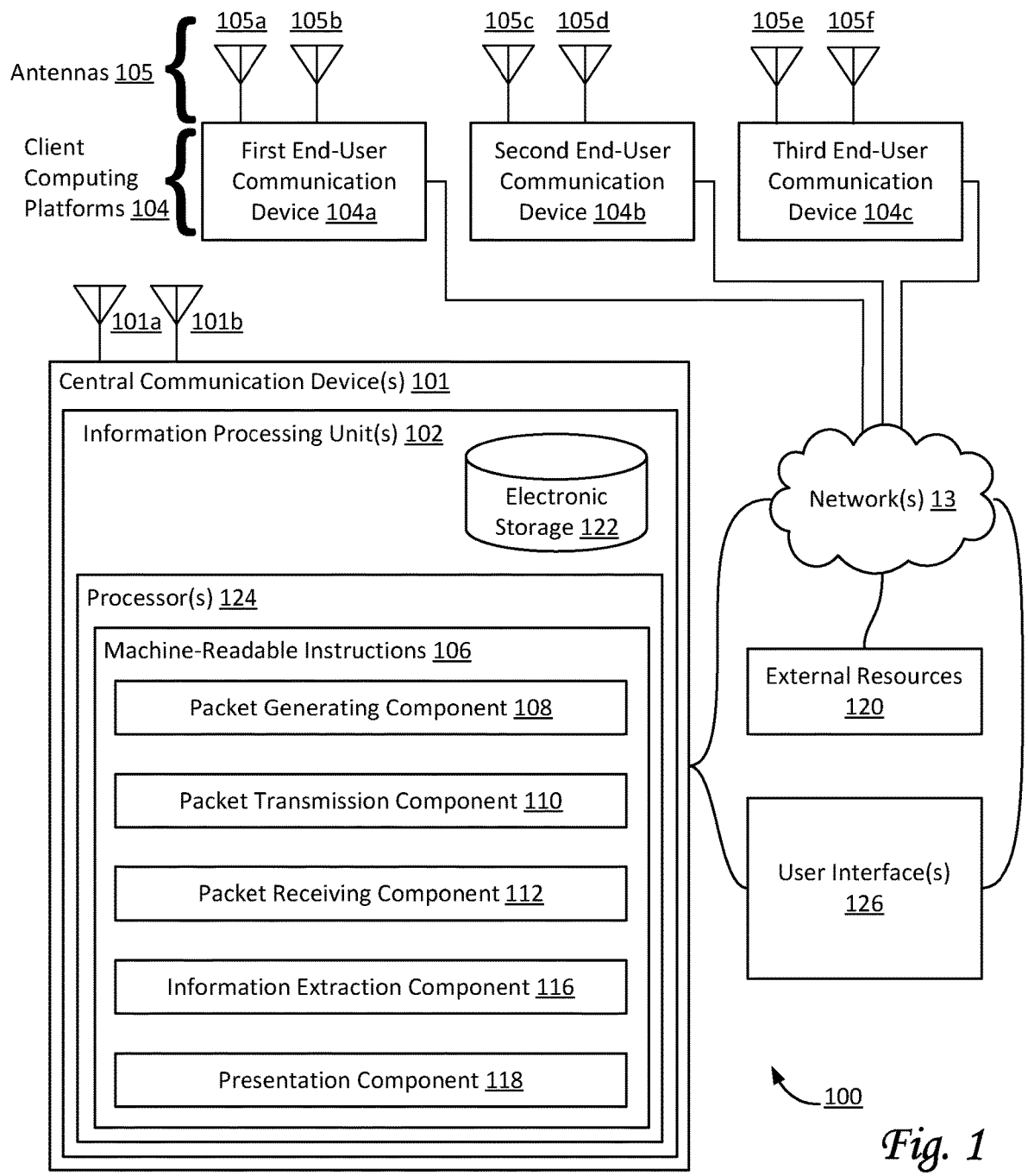
FIG. 1 illustrates a system configured for facilitating wireless intercom in a local communications network, in accordance with one or more implementations.

FIG. 1 illustrates a system 100 configured for facilitating wireless intercom in a local communications network, in accordance with one or more implementations. In some implementations, system 100 may include one or more central communication devices 101, one or more information processing units 102, electronic storage 122, one or more client computing platforms 104, external resources 120, one or more user interfaces 126, and/or other components. Central communication device(s) 101 and/or information processing unit(s) 102 may be configured to communicate with one or more client computing platforms 104 according to a client/server architecture, a point-to-multi-point, and/or other architectures. Client computing platform(s) 104 may be configured to communicate with other client computing platforms via information processing unit(s) 102 and/or according to a peer-to-peer architecture and/or other architectures. Users may access system 100 via client computing platform(s) 104. Client computing platforms 104 may include a first end-user communication device 104a, a second end-user communication device 104b, a third end-user communication device 104c, and/or other devices and/or computing platforms. First end-user communication device 104a may be associated with a first user, second end-user communication device 104b may be associated with a second user, third end-user communication device 104c may be associated with a third user, and so forth.

Central communication device 101 may include one or more information processing units 102, electronic storage 122, a first central antenna 101a, a second central antenna 101b, and/or other components. First central antenna 101a may be configured to operate in conjunction with a first transceiver (also referred to as a first central transceiver) of central communication device 101. Second central antenna 101b may be configured to operate in conjunction with a second transceiver (also referred to as a second central transceiver) of central communication device 101. Devices such as central communication device 101 may be referred to with the term "remote fixed part". In some implementations, central communication device 101 may be configured to facilitate wireless intercom in a local communications network among a set of client computing platforms 104, such as, for example, first end-user communication device 104a, second end-user communication device 104b, third end-user communication device 104c, and/or other devices and/or computing platforms. Devices such as an end-user communication device may be referred to with the term "portable part". In some implementations, central communication device 101 may be configured to facilitate wireless intercom among a set of client computing platforms 104 by simultaneous use of first central antenna 101a and second central antenna 101b (as well as the first and second transceivers, not depicted, that may be included in central communication device 101). By virtue of having two separate antennas and two separate transceivers, communications by central communication device 101 may be improved (by way of non-limiting example, in terms of reliability, audio quality, and/or other quality factors) by providing different types of diversity. The different types of diversity may include one or more of antenna diversity, transceiver diversity, spatial diversity (e.g., if multiple antennas on central communication device 101 are disposed and/or positioned in different locations), frequency diversity, channel diversity, time diversity, and/or other types of diversity.

In some implementations, communications over the local communications network between different end-user communication devices must not be direct (e.g., point-to-point), but must instead go through one or more central communication devices 101. In some implementations, central communication device 101 may include more than two antennas and/or more than two transceivers.

Individual client computing platforms 104 may include a first antenna, a second antenna, and/or other antennas. Individual client computing platforms 104 may include a first transceiver, a second transceiver, and/or other transceivers (not depicted). The first antenna of an individual client computing platform 104 may be configured to operate in conjunction with the first transceiver (also referred to as the first client transceiver), the second antenna of the individual client computing platform 104 may be configured to operate in conjunction with the second transceiver (also referred to as the second client transceiver), and so forth. For example, first end-user communication device 104a may include a first antenna 105a, a second antenna 105b, and/or other antennas. Second end-user communication device 104b may include a first antenna 105c, a second antenna 105d, and/or other antennas. Third end-user communication device 104c may include a first antenna 105e, a second antenna 105f, and/or other antennas, and so forth.

By virtue of having two separate antennas and two separate transceivers, communications by individual client computing platforms 104 may be improved (by way of non-limiting example, in terms of reliability, audio quality, and/or other quality factors) by providing different types of diversity. The different types of diversity may include one or more of antenna diversity, transceiver diversity, spatial diversity (e.g., if multiple antennas on a particular individual client computing platform 104 are disposed and/or positioned in different locations), frequency diversity, channel diversity, time diversity, and/or other types of diversity.

Communications between central communication device 101 and one or more client computing platforms 104 may be based on the exchange of packets of information that are formatted in one or more particular formats. As used herein, the direction from central communication device 101 to one or more client computing platforms 104 may be referred to as downlink and/or downstream. As used herein, the direction to central communication device 101 from one or more client computing platforms 104 may be referred to as uplink and/or upstream. Accordingly, information provided through uplink communication may be referred to as uplink information, information provided through downlink communication may be referred to as downlink information. In some implementations, packets may be formatted using a format based on the (IEEE) 802.11 family of standards. For example, in some implementations, packets may be Wi-Fi packets. In some implementations, downlink packets may be broadcast packets that are transmitted to multiple client computing platforms 104 at once. In some implementations, uplink packets may be device-specific packets that are transmitted by a particular client computing platform 104. Packetized communication may have overhead, e.g., due to the use of header information, which may reduce the efficiency of the communication. Broadcast packets may be more efficient than uplink packets, since information for multiple client computing platforms 104 may be transmitted at once, whereas uplink packets may only contain information for a single client computing platform 104.

Information processing unit(s) 102 may be configured by machine-readable instructions 106. Machine-readable instructions 106 may include one or more instruction components. The instruction components may include computer program components. The instruction components may include one or more of packet generating component 108, packet transmission component 110, packet receiving component 112, information extraction component 116, presentation component 118, and/or other instruction components.

Packet generating component 108 may be configured to generate packets, including but not limited to broadcast packets, device-specific packets, and/or other packets. In some implementations, broadcast packets may include a first broadcast packet, a second broadcast packet, a third broadcast packet, and/or other broadcast packets. In some implementations, one or more broadcast packets may be generated by central communication device 101. Individual broadcast packets may include packetized downlink information. By way of non-limiting example, (contents of) packetized downlink information may be based on audio and/or video information that was previously (e.g., in a previous timeframe) included in one or more other packets, e.g., one or more device-specific packets and/or other uplink information. In some implementations, individual broadcast packets may include a destination indication that indicates a network destination in the local communications network for the included packetized downlink information. For example, the network destination may include and/or indicate one or more specific client computing platforms 104. In some implementations, the network destination may include and/or indicate multiple client computing platforms 104.

In some implementations, device-specific packets may include a first device-specific packet, a second device-specific packet, a third device-specific packet, and/or other device-specific packets. In some implementations, one or more device-specific packets may be generated by individual client computing platforms 104. Individual device-specific packets may include packetized uplink information. By way of non-limiting example, (contents of) packetized uplink information may be based on audio and/or video information captured by individual client computing platforms 104, such as, e.g., audio information captured by a microphone included in first end-user communication device 104a, audio information captured by a microphone included in second end-user communication device 104b, video information captured by a camera included in first end-user communication device 104a, etc.

Packet transmission component 110 may be configured to transmit packets, including but not limited to broadcast packets, device-specific packets, and/or other packets. Transmission of packets may be scheduled, arranged, and/or otherwise timed in specific time periods. As used herein, time periods are periods of time, having a specified and/or limited duration. A set or sequence of time periods may be scheduled, arranged, and/or otherwise timed to occur in particular timeframes. In some implementations, different periods in a set or sequence may not overlap. For example, the duration of individual timeframes may be between 1 and 3 ms, between 4 and 6 ms, about 5 ms, between 5 and 10 ms, between 8 and 12 ms, about 10 ms, between 10 and 20 ms, and/or another duration. In some implementations, individual time periods may include time slots.

In some implementations, broadcast packets may be transmitted by central communication device 101. For example, a first broadcast packet may be transmitted via first central antenna 101a (of the first central transceiver) of central communication device 101 to a set of end-user communication devices. For example, a second broadcast packet may be transmitted via second central antenna 101b (of the second central transceiver) of central communication device 101 to the same set of end-user communication devices. In some implementations, the first and second broadcast packets may be transmitted in different time periods during the same timeframe. In some implementations, individual timeframes may include two broadcast packets. In some implementations, individual timeframes may include more than two broadcast packets. Transmission of the first broadcast packet may use a first channel of a first frequency range. As used herein, channels are designated sub-ranges within a frequency range, commonly having equal bandwidths and/or equally-spaced-apart bandwidths. For example, transmission of the second broadcast packet may use a second channel of the first frequency range (wherein the first channel is different from the second channel). For example, the frequency range may be 900 MHz, 1.9 GHz, 2.4 GHz, 5 GHz, and/or at least 5 GHz. In some implementations, individual channels of a particular frequency range may use a 5 MHz bandwidth per channel, 10 MHz, 20 MHz, 40 MHz, and/or use another bandwidth per channel. By way of non-limiting example, for the 5 GHz frequency range, so-called channel 8 may range from 5030 to 5050 MHz, channel 36 may range from 5170 to 5190 MHz, and so forth.

In some implementations, device-specific packets may be transmitted by individual client computing platforms 104. For example, a first device-specific packet may be transmitted via first antenna 105a (of a first client transceiver) of first end-user communication device 104a. For example, a second device-specific packet may be transmitted via first antenna 105c (of a different first client transceiver) of second end-user communication device 104b. For example, a third device-specific packet may be transmitted via first antenna 105e (of yet a different first client transceiver) of third end-user communication device 104c. In some implementations, the first, second, and third device-specific packets may be transmitted in different time periods and/or during the same timeframe. For example, transmission of the first device-specific packet may use the first channel of the first frequency range. For example, transmission of the second device-specific packet may use the first channel of the first frequency range. For example, transmission of the third device-specific packet may use the first channel of the first frequency range.

Figure 4A:
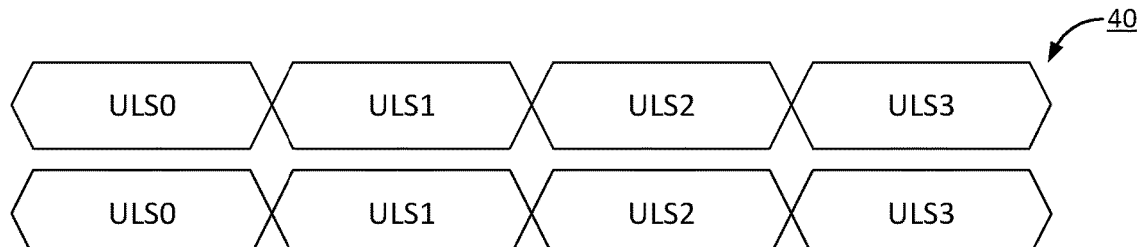
FIGS. 4A-4B-4C-4D-4E illustrate exemplary timing diagrams for the use of time periods on different channels and/or different frequency ranges, as may be used by a system configured for facilitating wireless intercom in a local communications network, in accordance with one or more implementations.

By way of non-limiting example, FIG. 4A illustrates an exemplary timing diagram 40 for the use of time periods on different channels and/or different frequency ranges, as may be used by system 100. For example, the top portion of timing diagram 40 may correspond to a first channel of a particular frequency range, and the bottom portion may correspond to a second channel of the same frequency range. As depicted in FIG. 4A, timing diagram 40 includes four time periods in each channel, which include packets labeled "ULS0", "ULS1", "ULS2", and "ULS3". For example, these time periods may be used to transmit uplink communication, in particular device-specific packets. For example, packet ULS0 may be transmitted by first end-user communication device 104a, packet ULS1 may be transmitted by second end-user communication device 104b, packet ULS2 may be transmitted by third end-user communication device 104c, and packet ULS3 may be transmitted by yet another end-user communication device. By transmitting the same packet on two different channels, communications by the end-user communication devices may be improved due to one or more types of diversity, including but not limited to antenna diversity and channel diversity. The time periods of timing diagram 40 may be part of the same timeframe.

Referring to FIG. 1, in some implementations, the same device-specific packets may additionally be transmitted in different time periods for greater diversity. For example, the first device-specific packet may be transmitted via second antenna 105b of first end-user communication device 104a in a different time period or at a different time than used with first antenna 105a. For example, second device-specific packet may be transmitted via second antenna 105d of second end-user communication device 104b in a different time period or at a different time than used with first antenna 105c. For example, third device-specific packet may be transmitted via second antenna 105f of third end-user communication device 104c in a different time period or at a different time than used with first antenna 105e. For example, this transmission of the first device-specific packet may use the second channel of the first frequency range, this transmission of the second device-specific packet may use the second channel of the first frequency range, and this transmission of the third device-specific packet may use the second channel of the first frequency range. In some implementations, transmissions of different device-specific packets may occur in non-overlapping time periods within the same timeframe. In some implementations, transmissions of different device-specific packets may occur in non-overlapping periods within the same timeframe.

Figure 4B:
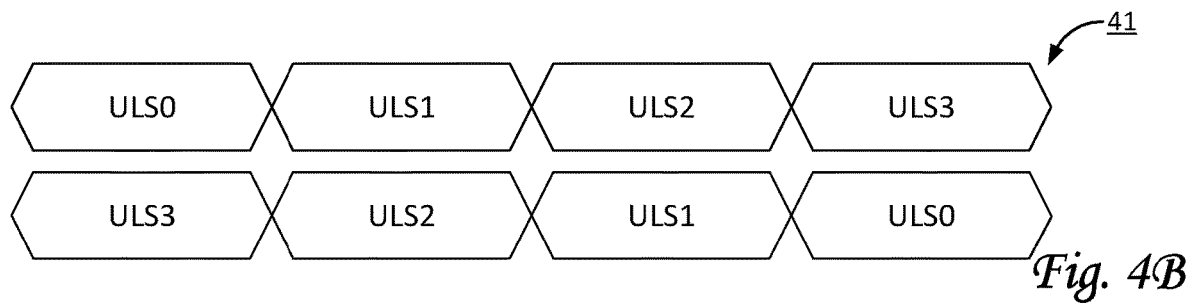

By way of non-limiting example, FIG. 4B illustrates an exemplary timing diagram 41 for the use of different time periods on different channels and/or different frequency ranges, as may be used by system 100. For example, the top portion of timing diagram 41 may correspond to a first channel of a particular frequency range, and the bottom portion may correspond to a second channel of the same frequency range. As depicted in FIG. 4B, timing diagram 41 includes four time periods in each channel. The top portion includes packets labeled "ULS0", "ULS1", "ULS2", and "ULS3", in sequence. The bottom portion includes packets labeled "ULS3", "ULS2", "ULS1", and "ULS0", in sequence. For example, these time periods may be used to transmit uplink communication, in particular device-specific packets. For example, packet ULS0 may be transmitted twice in different time periods by first end-user communication device 104a, packet ULS1 may be transmitted twice in different time periods by second end-user communication device 104b, packet ULS2 may be transmitted twice in different time periods by third end-user communication device 104c, and packet ULS3 may be transmitted twice in different time periods by another end-user communication device. By transmitting the same packet on two different channels and in different time periods, communications by the end-user communication devices may be improved due to one or more types of diversity, including but not limited to antenna diversity, channel diversity, and time diversity. The time periods of timing diagram 41 may be part of the same timeframe. As used herein, device-specific packets may be considered the same if the packetized uplink information represents the same captured audio and/or video information. For example, two device-specific packets may be considered the same despite differences in their respective header information. Note that packet ULS0 in the first channel may be received at the same time (and/or in overlapping time periods) as packet ULS3 in the second channel by central communication device 101 by virtue of the separate antennas and transceivers included in central communication device 101.

Figure 4C:
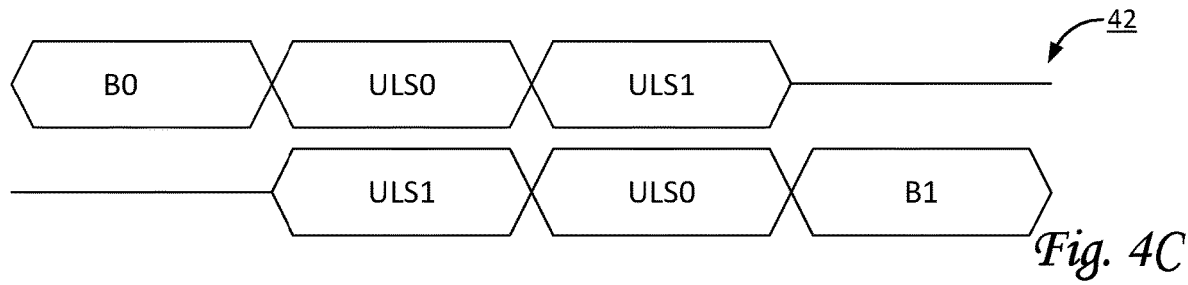

Referring to FIG. 1, packet transmission component 110 may be configured to transmit different broadcast packets via different antennas and different transceivers using different channels. For example, a first broadcast packet may be transmitted on a first channel via first central antenna 101a of central communication device 101 to a set of end-user communication devices. For example, a second broadcast packet may be transmitted on a second channel via second central antenna 101b of central communication device 101 to the same set of end-user communication devices. By way of non-limiting example, FIG. 4C illustrates an exemplary timing diagram 42 for the use of time periods on different channels and/or different frequency ranges, as may be used by system 100. For example, the top portion of timing diagram 42 may correspond to a first channel of a particular frequency range, and the bottom portion may correspond to a second channel of the same frequency range. As depicted in FIG. 4C, timing diagram 42 includes four time periods in each channel, which include packets labeled "B0", "B1", "ULS0", and "ULS1". For example, these time periods may be used to transmit both downlink and uplink communication, in particular broadcast packets and device-specific packets. For example, broadcast packet B0 may be transmitted by central communication device 101 on the first channel, in the first time period. Next, device-specific packets ULS0 and ULS1 may be transmitted by first end-user communication device 104a and second end-user communication device 104b, respectively, in the second and third time period on the first channel, and furthermore, in the third and second time period on the second channel. Next, broadcast packet B1 may be transmitted by central communication device 101 on the second channel, in the fourth and last time period shown in timing diagram 42. The time periods of timing diagram 42 may be part of the same timeframe.

Figure 4D:
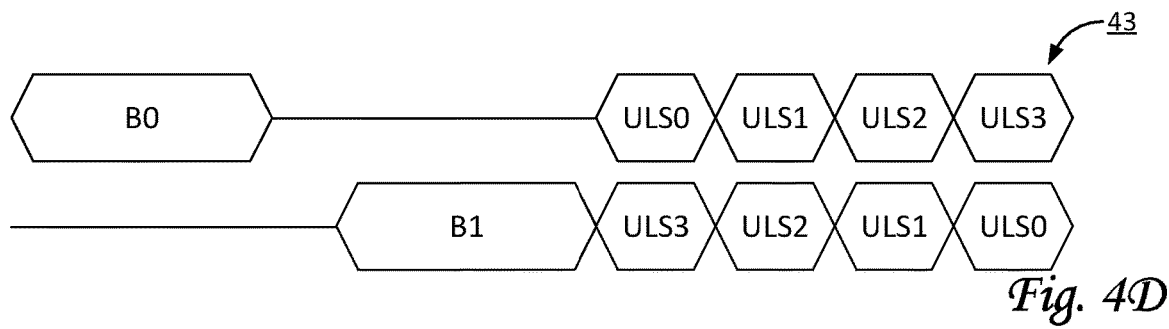

In some implementations, transmissions of different broadcast packets may occur in non-overlapping time periods and/or within the same timeframe. By way of non-limiting example, FIG. 4D illustrates an exemplary timing diagram 43 for the use of time periods on different channels and/or different frequency ranges, as may be used by system 100. For example, the top portion of timing diagram 43 may correspond to a first channel of a particular frequency range, and the bottom portion may correspond to a second channel of the same frequency range. As depicted in FIG. 4D, timing diagram 43 includes at least six time periods in each channel, which include packets labeled "B0", "B1", "ULS0", "ULS1", "ULS2", and "ULS3". For example, these time periods may be used to transmit both downlink and uplink communication, in particular broadcast packets and device-specific packets. For example, broadcast packet B0 may be transmitted by central communication device 101 on the first channel, in a first time period. Next, after a brief pause, broadcast packet B1 may be transmitted by central communication device 101 on the second channel, in the second time period shown in timing diagram 43. Next, device-specific packets ULS0, ULS1, ULS2, and ULS3 may be transmitted by first end-user communication device 104a and second end-user communication device 104b, respectively, in the third, fourth, fifth, and sixth time period on the first channel, and furthermore, in the sixth, fifth, fourth, and third time period on the second channel. The time periods of timing diagram 43 may be part of the same timeframe.

Referring to FIG. 1, packet receiving component 112 may be configured to receive packets, including but not limited to broadcast packets, device-specific packets, and/or other packets. Receipt of packets may be scheduled, arranged, and/or otherwise timed in specific time periods. In some implementations, central communication device 101 may be configured to receive one or more device-specific packets.

For example, a first device-specific packet may be received on a first channel by first central antenna 101a, e.g., during a first uplink time period. The first device-specific packet may be received from first end-user communication device 104a. The first device-specific packet may include packetized uplink information based on audio and/or video information captured by first end-user communication device 104a. The audio and/or video information captured by the first end-user communication device may be part of audio communication (through system 100) between a first user and a second user. Packet receiving component 112 may be configured to receive a second device-specific packet, on the first channel by first central antenna 101a, e.g., during a second uplink time period. The second device-specific packet may be received from second end-user communication device 104b. Packet receiving component 112 may be configured to receive the first device-specific packet, on the second channel by second central antenna 101b, e.g., during a third uplink time period. The first device-specific packet may be received from first end-user communication device 104a. The third uplink time period may not coincide with the first uplink time period, thereby providing time diversity for communications of the first device-specific packet by first end-user communication device 104a. The first channel may use a different frequency band than the second channel, thereby providing frequency diversity for communications of the first device-specific packet by first end-user communication device 104a. Additionally, packet receiving component 112 may be configured to receive the second device-specific packet, on the second channel by second central antenna 101b, e.g., during a fourth uplink time period. The second device-specific packet may be received from second end-user communication device 104b. The fourth uplink time period may not coincide with the second uplink time period. By way of non-limiting example, this example is illustrated by the uplink communication depicted in FIG. 4C, with the top portion showing the first and second time periods (for device-specific packets ULS0 and ULS1 in chronological order) and the bottom portion showing the fourth and third time periods (for device-specific packets ULS1 and ULS0 in chronological order). Note that both transmissions of ULS0 occur in non-overlapping uplink time periods (i.e., uplink time periods that do not coincide), and further note that both transmissions of ULS1 occur in non-overlapping uplink time periods (i.e., uplink time periods that do not coincide). Packet ULS0 in the first channel may be received at the same time (and/or in overlapping time periods) as packet ULS1 in the second channel by central communication device 101 by virtue of the separate antennas and transceivers included in central communication device 101.

Information extraction component 116 may be configured to extract audio and/or video information from packets, including but not limited to broadcast packets, device-specific packets, and/or other packets. For example, information extraction component 116 may be configured to extract audio and/or video information from a particular broadcast packet. For example, information extraction component 116 may be configured to extract audio and/or video information from a particular device-specific packet.

Presentation component 118 may be configured to present information to users. For example, presentation component 118 may be configured to present an audio signal to a particular user, the audio signal being based on audio information extracted by information extraction component 116. Subsequently, the particular user may listen to the audio signal. In some implementations, presentation component 118 may be configured to present information through user interface 127. For example, presentation component 118 may be configured to present a video signal to the particular user, the video signal being based on video information extracted by information extraction component 116. Subsequently, the particular user may view the video signal. In some implementations, presentation component 118 may be configured to present video information through user interface 127.

In some implementations, central communication device(s) 101, information processing unit(s) 102, client computing platform(s) 104, and/or external resources 120 may be operatively linked via one or more electronic communication links. For example, such electronic communication links may be established, at least in part, via one or more networks 13 and/or other networks. It will be appreciated that this is not intended to be limiting, and that the scope of this disclosure includes implementations in which central communication device(s) 101, information processing unit(s) 102, client computing platform(s) 104, and/or external resources 120 may be operatively linked via some other communication media.

Figure 5:
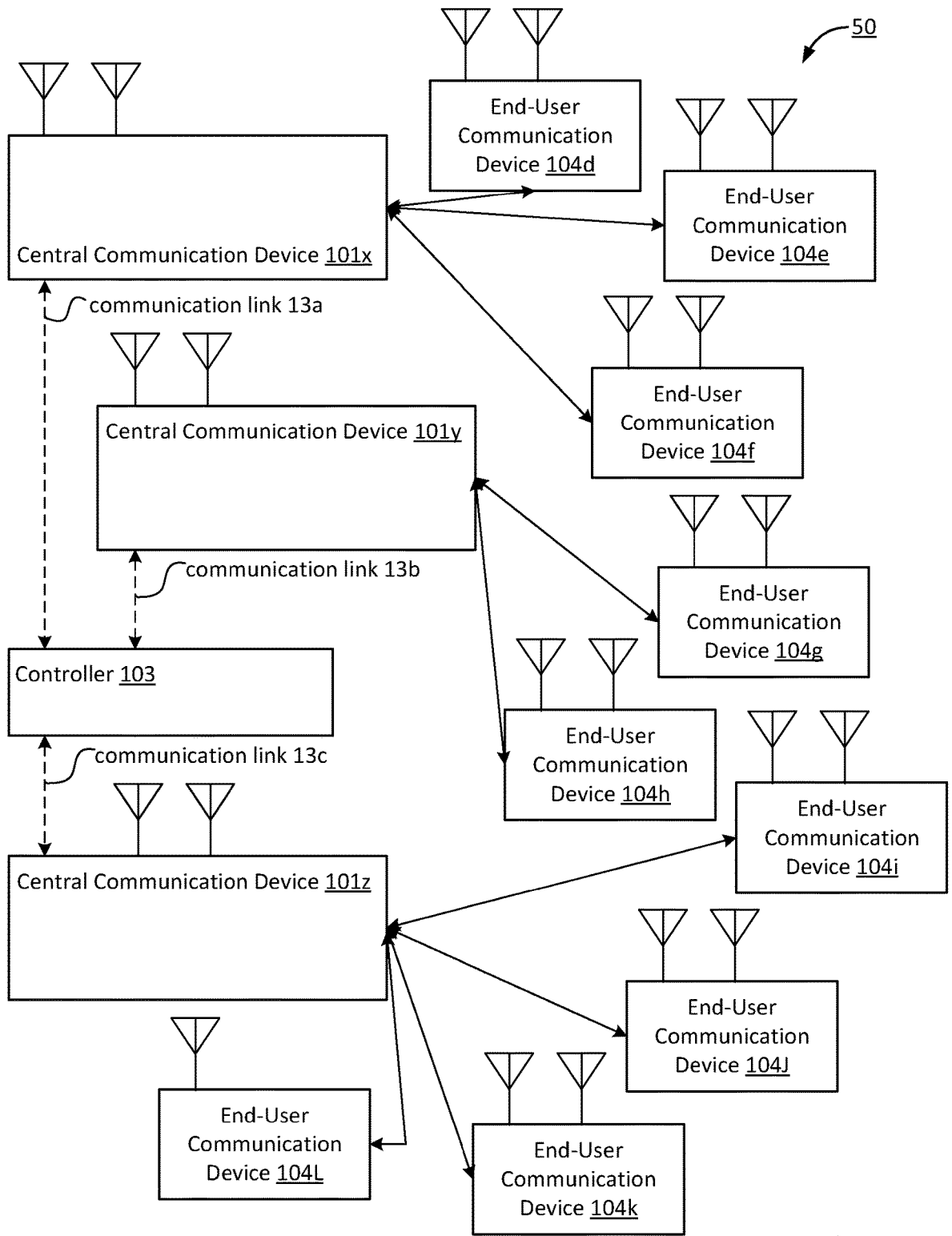
FIG. 5 illustrates an exemplary local communications network, as may be used by a system configured for facilitating wireless intercom in the local communications network, in accordance with one or more implementations.

By way of non-limiting example, FIG. 5 illustrates an exemplary local communications network 50, as may be used by a system similar to or the same as system 100. As depicted, local communications network 50 may include central communication device 101x, central communication device 101y, and central communication device 101z, all of which may be similar to central communication device 101 as described in this disclosure, and having dual antennas. As depicted, central communication device 101x may communicate using a communication link 13a with a controller 103, central communication device 101y may communication using a communication link 13b with controller 103, and central communication device 101z may communicate using a communication link 13c with controller 103, which may be configured to facilitate communicate between central communication device 101x, central communication device 101y, and/or central communication device 101z.

Additionally, local communications network 50 may include a set of end-user communication devices similar to, e.g., first end-user communication device 104a as described in this disclosure, and having dual antennas. As depicted, the set of end-user communication devices may include end-user communication devices 104d, 104e, 104f, 104g, 104h, 104i, 104J, 104k, and 104L. In some implementations, individual ones of the set of end-user communication devices may be configured to communicate through one of the central communication devices shown in local communications network 50. For example, end-user communication devices 104d, 104e, and 104f may be configured to communicate with central communication device 101x, in accordance with the description in this disclosure. For example, end-user communication devices 104g, and 104h may be configured to communicate with central communication device 101y, in accordance with the description in this disclosure. For example, end-user communication devices 104i, 104J, 104k, and 104L may be configured to communicate with central communication device 101z, in accordance with the description in this disclosure. By way of non-limiting example, a user of end-user communication device 104d may communicate through audio with the user of end-user communication devices 104e by transmitting uplink packets to central communication device 101x, which subsequently transmits downlink packets to end-user communication devices 104e. In some implementations, users may broadcast audio to multiple other users. By way of non-limiting example, a user of end-user communication devices 104i may communicate through audio with the users of end-user communication devices 104J and 104k by transmitting uplink packets to central communication device 101z, which subsequently transmits downlink packets to end-user communication devices 104J and 104k. In some implementations, users may communicate across multiple central communication devices. By way of non-limiting example, a user of end-user communication devices 104g may communicate through audio with the user of end-user communication devices 104i by transmitting uplink packets to central communication device 101y, which subsequently communicates through controller 103 with central communication device 101z, which subsequently transmits downlink packets to end-user communication devices 104i. In some implementations, users may broadcast to multiple users across multiple central communication devices. In some implementations, individual end-user communication devices may only communicate and/or connect with a single central communication device (unless an individual end-user communication device is in the process of migrating to a different central communication device). In some implementations, end-user communication devices may roam from one central communication device to another central communication device, e.g., based on the quality of their connection and/or other considerations.

Figure 4E:
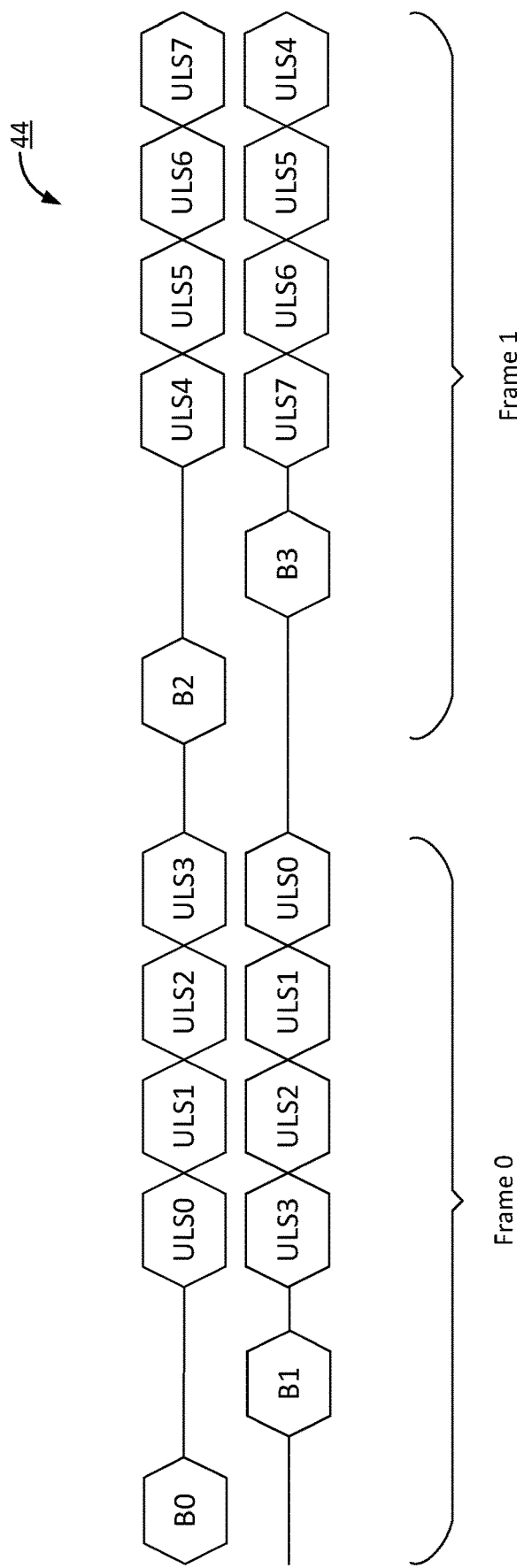

In some implementations, transmissions of different broadcast packets may occur in different timeframes. By way of non-limiting example, FIG. 4E illustrates an exemplary timing diagram 44 for the use of time periods on different channels and/or different frequency ranges, as may be used by system 100. For example, the top portion of timing diagram 44 may correspond to a first channel of a particular frequency range, and the bottom portion may correspond to a second channel of the same frequency range. As depicted in FIG. 4E, timing diagram 44 includes at least twelve time periods in each channel, which include packets labeled "B0", "B1", "B2", "B3", "ULS0", "ULS1", "ULS2", "ULS3", "ULS4", "ULS5", "ULS6", and "ULS7". For example, these time periods may be used to transmit both downlink and uplink communication, in particular broadcast packets and device-specific packets. For example, broadcast packet B0 may be transmitted by central communication device 101 on the first channel, in a first time period. Next, after a brief pause, broadcast packet B1 may be transmitted by central communication device 101 on the second channel, in the second time period shown in timing diagram 43. Next, device-specific packets ULS0, ULS1, ULS2, and ULS3 may be transmitted by first end-user communication device 104a and second end-user communication device 104b, respectively, in the third, fourth, fifth, and sixth time period on the first channel, and furthermore, in the sixth, fifth, fourth, and third time period on the second channel. These time periods of timing diagram 44 may be part of the same timeframe labeled "Frame 0". Subsequently, in a timeframe labeled "Frame 1", broadcast packet B2 may be transmitted by central communication device 101 on the first channel. Next, after a brief pause, broadcast packet B3 may be transmitted by central communication device 101 on the second channel. Next, device-specific packets ULS4, ULS5, ULS6, and ULS7 may be transmitted by first end-user communication device 104a and second end-user communication device 104b, respectively, on the first channel and the second channel. One or more of the broadcast packets transmitted during Frame 1 may include packetized downlink information that is based on audio information included in one or more device-specific packets that were transmitted and received during Frame 0. In some implementations, Frame 1 and Frame 0 may be further apart than depicted in FIG. 4E. For example, multiple other timeframes may occur between Frame 0 and Frame 1 as described above.

Referring to FIG. 1, a given client computing platform 104 may include one or more processors configured to execute computer program components. The computer program components may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a belt pack, a gaming console, and/or other computing platforms.

In some implementations, system 100 may include an alternate type of client computing platform 104 that includes only one (working and/or operational) antenna and corresponding transceiver. Such a version of client computing platform 104 may be referred to as a disadvantaged end-user device. In some implementations, a disadvantaged end-user device may be configured to communicate with central communication device 101 by controlling the single antenna and the single transceiver to switch back and forth between two channels (the first channel and second channel described elsewhere in this disclosure). By way of non-limiting example, end-user communication devices 104L as depicted in FIG. 5 may be a disadvantaged end-user device.

External resources 120 may include sources of information outside of system 100, external entities participating with system 100, and/or other resources. In some implementations, some or all of the functionality attributed herein to external resources 120 may be provided by resources included in system 100.

Information processing unit(s) 102 may include electronic storage 122, one or more processors 124, and/or other components. Information processing unit(s) 102 may include communication lines, or ports to enable the exchange of information with a network and/or other computing platforms. Illustration of information processing unit(s) 102 in FIG. 1 is not intended to be limiting. Information processing unit(s) 102 may include a plurality of hardware, software, and/or firmware components operating together to provide the functionality attributed herein to information processing unit(s) 102. For example, information processing unit(s) 102 may be implemented by a cloud of computing platforms operating together as information processing unit(s) 102. In some implementations, individual information processing units may be servers.

User interfaces 126 may be configured to facilitate interaction between users and system 100 and/or between users and client computing platforms 104. For example, user interfaces 126 may provide an interface through which users may provide information to and/or receive information from system 100. In some implementations, user interface 126 may include one or more of a display screen, touchscreen, monitor, a keyboard, buttons, switches, knobs, levers, mouse, speakers, headphones, microphones, sensors to capture voice commands, sensors to capture eye movement and/or body movement, sensors to capture hand and/or finger gestures, and/or other user interface devices configured to receive and/or convey user input. In some implementations, one or more user interfaces 126 may be included in one or more client computing platforms 104. In some implementations, one or more user interfaces 126 may be included in system 100.

Electronic storage 122 may comprise non-transitory storage media that electronically stores information. The electronic storage media of electronic storage 122 may include one or both of system storage that is provided integrally (i.e., substantially non-removable) with information processing unit(s) 102 and/or removable storage that is removably connectable to information processing unit(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from information processing unit(s) 102, information received from client computing platform(s) 104, and/or other information that enables information processing unit(s) 102 to function as described herein.

Processor(s) 124 may be configured to provide information processing capabilities in information processing unit(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 116, and/or 118, and/or other components. Processor(s) 124 may be configured to execute components 108, 110, 112, 116, and/or 118, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 116, and/or 118 are illustrated in FIG. 1 as being implemented within a single processing unit, in implementations in which processor(s) 124 includes multiple processing units, one or more of components 108, 110, 112, 116, and/or 118 may be implemented remotely from the other components. The description of the functionality provided by the different components 108, 110, 112, 116, and/or 118 described below is for illustrative purposes, and is not intended to be limiting, as any of components 108, 110, 112, 116, and/or 118 may provide more or less functionality than is described. For example, one or more of components 108, 110, 112, 116, and/or 118 may be eliminated, and some or all of its functionality may be provided by other ones of components 108, 110, 112, 116, and/or 118. As another example, processor(s) 124 may be configured to execute one or more additional components that may perform some or all of the functionality attributed below to one of components 108, 110, 112, 116, and/or 118.

Figure 2:
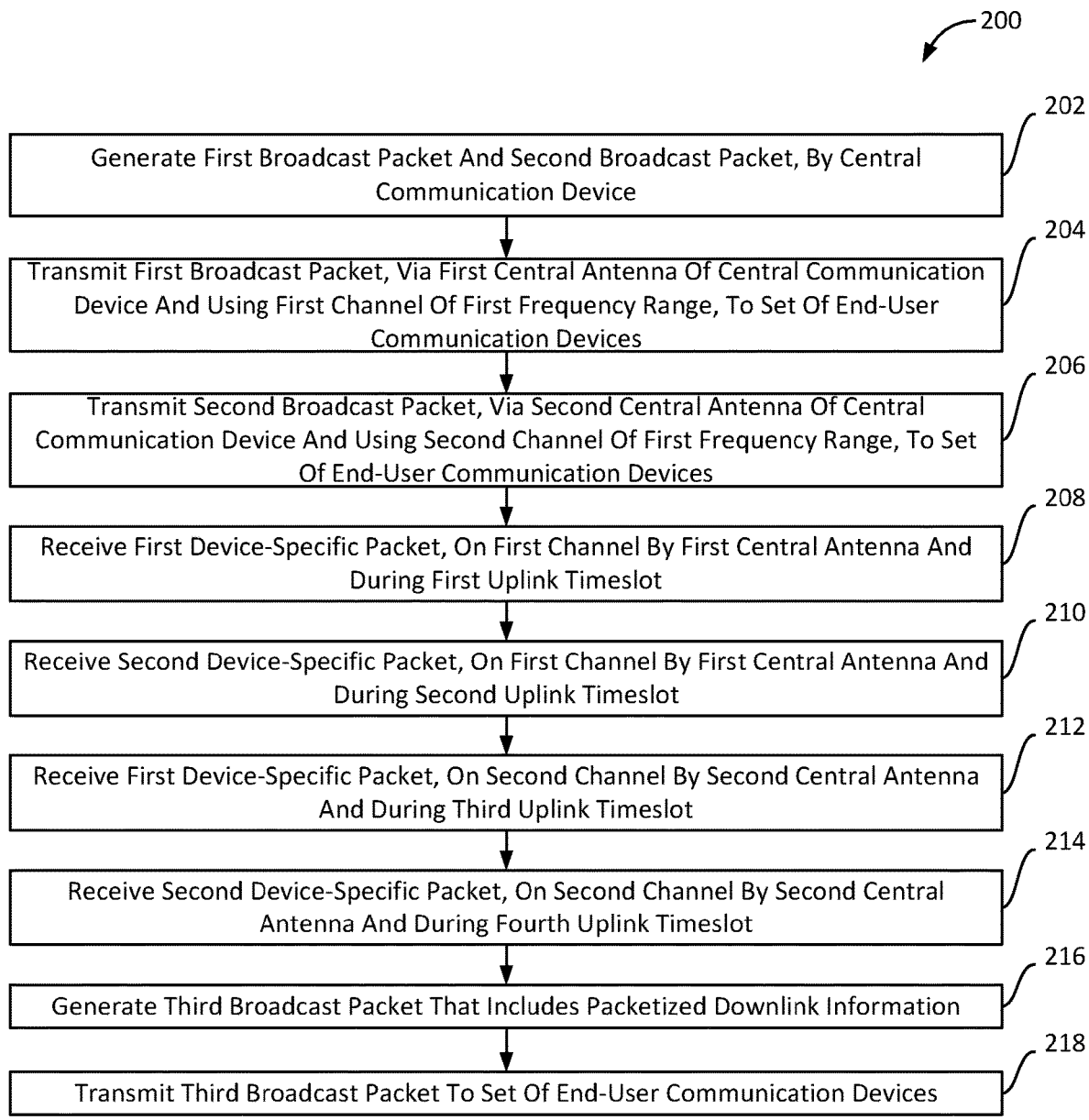
FIGS. 2 and 3 illustrate methods for facilitating wireless intercom in a local communications network, in accordance with one or more implementations.
Figure 3:
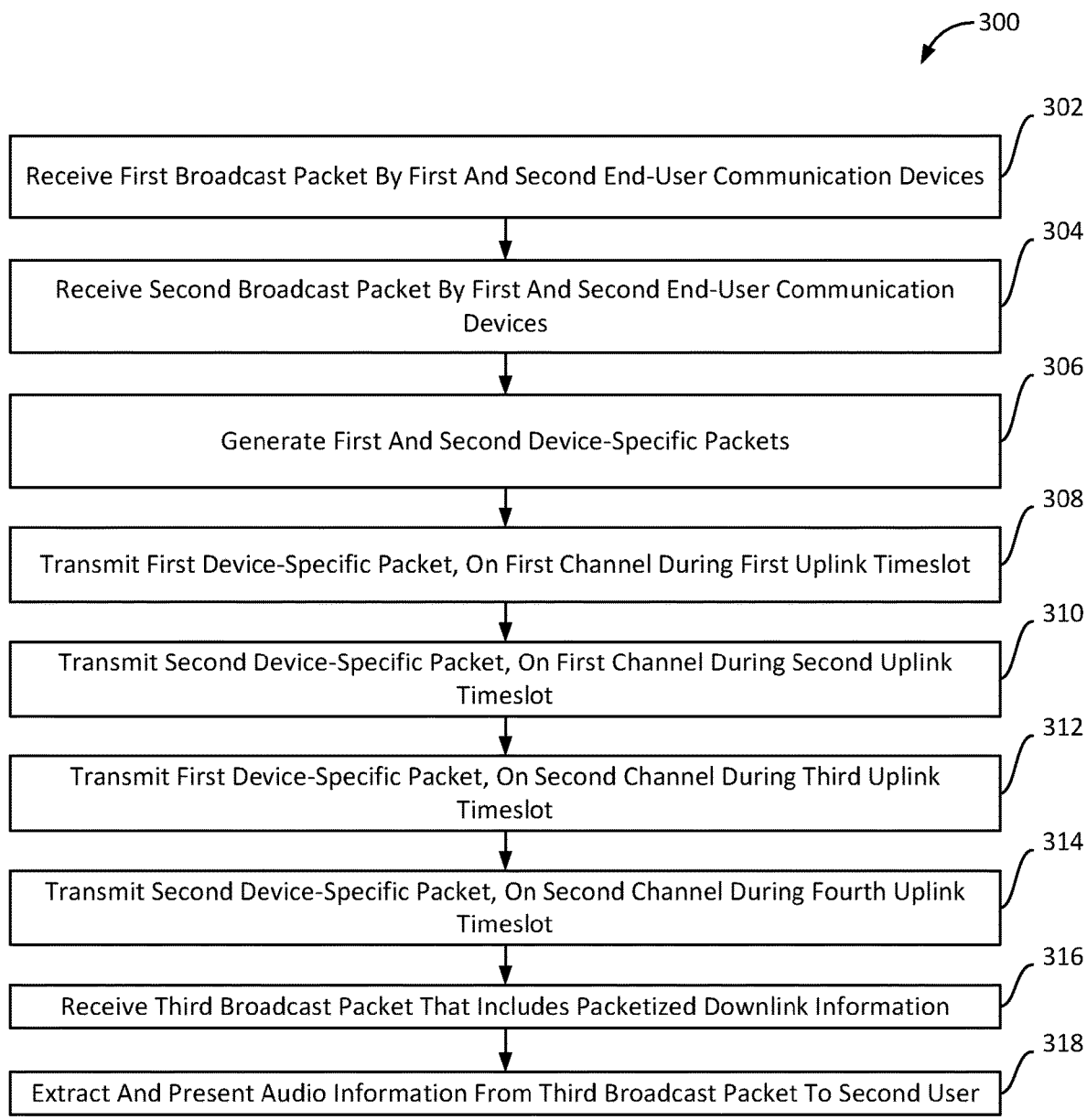

FIGS. 2 and 3 illustrate methods 200 and 300 respectively, for facilitating wireless intercom in a local communications network, in accordance with one or more implementations. The operations of methods 200 and 300 presented below are intended to be illustrative. In some implementations, methods 200 and 300 may be accomplished with one or more additional operations not described, and/or without one or more of the operations discussed. Additionally, the order in which the operations of methods 200 and 300 are illustrated in FIGS. 2 and 3, respectively, and described below is not intended to be limiting. The operations of methods 200 and 300 may be performed using time periods, or periods, or both.

In some implementations, methods 200 and 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 200 and 300 in response to instructions stored electronically on an electronic storage medium, including but not limited to electronic storage 122. The one or more processing devices may include one or more devices configured through hardware, firmware, and/or software to be specifically designed for execution of one or more of the operations of methods 200 and 300.

Regarding method 200, an operation 202 may include generating a first broadcast packet and a second broadcast packet, e.g., by central communication device 101. Operation 202 may be performed by one or more hardware processors configured by machine-readable instructions including a component that is the same as or similar to packet generating component 108, in accordance with one or more implementations.

An operation 204 may include transmitting the first broadcast packet, via a first central antenna of the central communication device and using a first channel of a first frequency range, to the set of end-user communication devices. The set of end-user communication devices may include a first end-user communication device and a second end-user communication device. Operation 204 may be performed by one or more hardware processors configured by machine-readable instructions including a component that is the same as or similar to packet transmission component 110, in accordance with one or more implementations.

An operation 206 may include transmitting the second broadcast packet, via a second central antenna of the central communication device and using a second channel of the first frequency range, to the set of end-user communication devices. Operation 206 may be performed by one or more hardware processors configured by machine-readable instructions including a component that is the same as or similar to packet transmission component 110, in accordance with one or more implementations.

An operation 208 may include receiving a first device-specific packet, on the first channel by the first central antenna and during a first uplink time period. The first device-specific packet may be received from the first end-user communication device. The first device-specific packet may include packetized uplink information based on audio and/or video information captured by the first end-user communication device. Operation 208 may be performed by one or more hardware processors configured by machine-readable instructions including a component that is the same as or similar to packet receiving component 112, in accordance with one or more implementations.

An operation 210 may include receiving a second device-specific packet, on the first channel by the first central antenna and during a second uplink time period. The second device-specific packet may be received from the second end-user communication device. Operation 210 may be performed by one or more hardware processors configured by machine-readable instructions including a component that is the same as or similar to packet receiving component 112, in accordance with one or more implementations.

An operation 212 may include receiving the first device-specific packet, on the second channel by the second central antenna and during a third uplink time period. The first device-specific packet may be received from the first end-user communication device. The third uplink time period may not coincide with the first uplink time period, thereby providing time diversity for communications of the first device-specific packet by the first end-user communication device. The first channel may use a different frequency band than the second channel, thereby providing frequency diversity for communications of the first device-specific packet by the first end-user communication device. Operation 212 may be performed by one or more hardware processors configured by machine-readable instructions including a component that is the same as or similar to packet receiving component 112, in accordance with one or more implementations.

An operation 214 may include receiving the second device-specific packet, on the second channel by the second central antenna and during a fourth uplink time period. The second device-specific packet may be received from the second end-user communication device. The fourth uplink time period may not coincide with the second uplink time period. Operation 214 may be performed by one or more hardware processors configured by machine-readable instructions including a component that is the same as or similar to packet receiving component 112, in accordance with one or more implementations.

An operation 216 may include generating a third broadcast packet that includes packetized downlink information. The packetized downlink information may be based on the audio and/or video information of the first device-specific packet. The third broadcast packet may include a destination indication that indicates a network destination in the local communications network for the included packetized downlink information. The network destination may include the second end-user communication device. Operation 216 may be performed by one or more hardware processors configured by machine-readable instructions including a component that is the same as or similar to packet generating component 108, in accordance with one or more implementations.

An operation 218 may include transmitting the third broadcast packet to the set of end-user communication devices. Operation 218 may be performed by one or more hardware processors configured by machine-readable instructions including a component that is the same as or similar to packet transmission component 110, in accordance with one or more implementations.

Regarding method 300, an operation 302 may include receiving a first broadcast packet, e.g., by first and second end-user communication devices 104*a* and 104*b*. Operation 302 may be performed by one or more hardware processors configured by machine-readable instructions including a component that is the same as or similar to packet receiving component 112, in accordance with one or more implementations.

An operation 304 may include receiving a second broadcast packet, e.g., by first and second end-user communication devices 104*a* and 104*b*. Operation 304 may be performed by one or more hardware processors configured by machine-readable instructions including a component that is the same as or similar to packet receiving component 112, in accordance with one or more implementations.

An operation 306 may include generating first and second device-specific packets, e.g., by first and second end-user communication devices 104a and 104b, respectively. Operation 306 may be performed by one or more hardware processors configured by machine-readable instructions including a component that is the same as or similar to packet generating component 108, in accordance with one or more implementations.

An operation 308 may include transmitting the first device-specific packet, on the first channel and during a first uplink time period. The first device-specific packet may be transmitted by first end-user communication device 104a. The first device-specific packet may include packetized uplink information based on audio and/or video information captured by first end-user communication device 104a. Operation 308 may be performed by one or more hardware processors configured by machine-readable instructions including a component that is the same as or similar to packet transmission component 110, in accordance with one or more implementations.

An operation 310 may include transmitting the second device-specific packet, on the first channel and during a second uplink time period. The second device-specific packet may be transmitted by second end-user communication device 104b. Operation 310 may be performed by one or more hardware processors configured by machine-readable instructions including a component that is the same as or similar to packet transmission component 110, in accordance with one or more implementations.

An operation 312 may include transmitting the first device-specific packet, on the second channel and during a third uplink time period. The first device-specific packet may be transmitted by first end-user communication device 104a. Operation 312 may be performed by one or more hardware processors configured by machine-readable instructions including a component that is the same as or similar to packet transmission component 110, in accordance with one or more implementations.

An operation 314 may include transmitting the second device-specific packet, on the second channel and during a fourth uplink time period. The second device-specific packet may be transmitted by second end-user communication device 104b. Operation 314 may be performed by one or more hardware processors configured by machine-readable instructions including a component that is the same as or similar to packet transmission component 110, in accordance with one or more implementations.

An operation 316 may include receiving a third broadcast packet that includes packetized downlink information, e.g., by first and second end-user communication devices 104a and 104b. Operation 316 may be performed by one or more hardware processors configured by machine-readable instructions including a component that is the same as or similar to packet receiving component 112, in accordance with one or more implementations.

An operation 318 may include extracting audio and/or video information from the third broadcast packet and presenting the extracted information to a particular user. Operation 318 may be performed by one or more hardware processors configured by machine-readable instructions including one or more components that are the same as or similar to information extraction component 116 and presentation component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating wireless intercom in a local communications network, the system comprising:
    one or more hardware processors configured by machine-readable instructions to:
        transmit a first broadcast packet to a set of end-user communication devices, wherein transmitting the first broadcast packet uses a first channel of a first frequency range, wherein the set of end-user communication devices includes a first end-user communication device and a second end-user communication device;
        transmit a second broadcast packet to the set of end-user communication devices, wherein transmitting the second broadcast packet uses a second channel of the first frequency range;
        receive a first device-specific packet, on the first channel during a first uplink time period, wherein the first device-specific packet is received from the first end-user communication device, wherein the first device-specific packet includes information based on audio information captured by the first end-user communication device;
        receive a second device-specific packet, on the first channel during a second uplink time period, wherein the second device-specific packet is received from the second end-user communication device, wherein the first time period is different from the second time period;
        receive the first device-specific packet, on the second channel during a third uplink time period, wherein the first device-specific packet is received from the first end-user communication device, wherein the third uplink time period does not coincide with the first uplink time period, and wherein the first channel uses a different frequency band than the second channel;
        receive the second device-specific packet, on the second channel during a fourth uplink time period, wherein the second device-specific packet is received from the second end-user communication device, and wherein the fourth uplink time period does not coincide with the second uplink time period; and
        transmit a third broadcast packet that includes packetized downlink information to the set of end-user communication devices, wherein the packetized downlink information is based on the audio information of the first device-specific packet, wherein the third broadcast packet includes a destination indication that indicate one or more network destinations in the local communications network, wherein the one or more network destinations include the second end-user communication device.

2. The system of claim 1, wherein the information included in the first device-specific packet includes packetized information.

3. The system of claim 1, wherein the third time period is different from the fourth time period.

4. The system of claim 1, wherein the first broadcast packet is transmitted via a first transceiver of the central communication device.

5. The system of claim 1, wherein the second broadcast packet is transmitted via a second transceiver.

6. The system of claim 1, wherein the first frequency range is at least 5 GHz.

7. The system of claim 1, wherein the first end-user communication device is associated with a first user, wherein the second end-user communication device is associated with a second user, wherein the audio information captured by the first end-user communication device is part of audio communication between the first user and the second user.

8. The system of claim 1, wherein transmitting the first broadcast packet and the second broadcast packet occurs in non-overlapping time periods.

9. The system of claim 1, wherein a duration of the first timeframe is between 8 ms and 12 ms.

10. The system of claim 1, wherein a duration of the first timeframe is between 5 ms and 10 ms.

11. The system of claim 1, wherein a duration of the first timeframe is between 10 ms and 20 ms.

12. The system of claim 1, wherein the one or more hardware processors are further configured by machine-readable instructions to:
   receive the third broadcast packet, by the second end-user communication device;
   extract particular audio information from the third broadcast packet, by the second end-user communication device; and
   present, an audio signal to the second user, by the second end-user communication device, wherein the audio signal is based on the particular audio information.

13. A method for facilitating wireless intercom in a local communications network, the method comprising:
   transmitting a first broadcast packet, using a first channel of a first frequency range, to a set of end-user communication devices, wherein the set of end-user communication devices includes a first end-user communication device and a second end-user communication device;
   transmitting a second broadcast packet, using a second channel of the first frequency range, to the set of end-user communication devices;
   receiving a first device-specific packet, on the first channel during a first uplink time period, wherein the first device-specific packet is received from the first end-user communication device, wherein the first device-specific packet includes information based on audio information captured by the first end-user communication device;
   receiving a second device-specific packet, on the first channel during a second uplink time period, wherein the second device-specific packet is received from the second end-user communication device;
   receiving the first device-specific packet, on the second channel during a third uplink time period, wherein the first device-specific packet is received from the first end-user communication device, wherein the third uplink time period does not coincide with the first uplink time period, and wherein the first channel uses a different frequency band than the second channel;
   receiving the second device-specific packet, on the second channel during a fourth uplink time period, wherein the second device-specific packet is received from the second end-user communication device, and wherein the fourth uplink time period does not coincide with the second uplink time period; and
   transmitting a third broadcast packet that includes packetized downlink information to the set of end-user communication devices, wherein the packetized downlink information is based on the audio information of the first device-specific packet, wherein the third broadcast packet includes a destination indication that indicates one or more network destinations in the local communications network, wherein the one or more network destinations include the second end-user communication device.

14. The method of claim 13, wherein the information included in the first device-specific packet includes packetized information.

15. The method of claim 13, wherein the third time period is different from the fourth time period.

16. The method of claim 13, wherein the first broadcast packet is transmitted via a first transceiver of the central communication device.

17. The method of claim 13, wherein the second broadcast packet is transmitted via a second transceiver.

18. The method of claim 13, wherein the first end-user communication device is associated with a first user, wherein the second end-user communication device is associated with a second user, wherein the audio information captured by the first end-user communication device is part of audio communication between the first user and the second user.

19. The method of claim 13, wherein transmitting the first broadcast packet and the second broadcast packet occurs in non-overlapping time periods.

20. The method of claim 19, wherein the non-overlapping time periods and the first, second, third, and fourth uplink time periods occur within a first timeframe having a duration between 10 ms and 20 ms.

* * * * *